(No Model.)  J. H. CONNELLY.  2 Sheets—Sheet 1.
ELECTRIC WIRE FENCE.
No. 252,599. Patented Jan. 24, 1882.
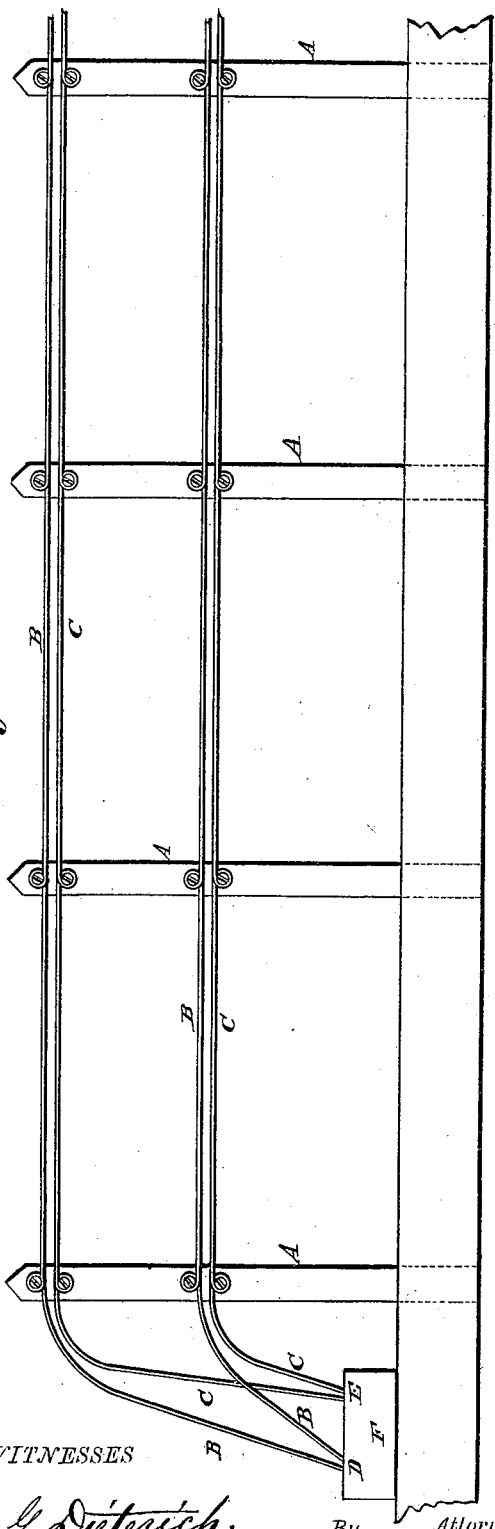
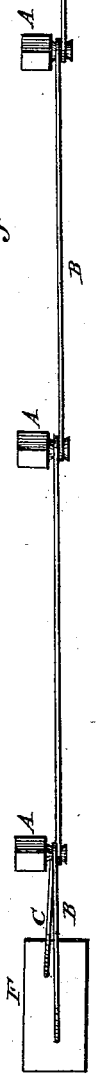
WITNESSES
INVENTOR

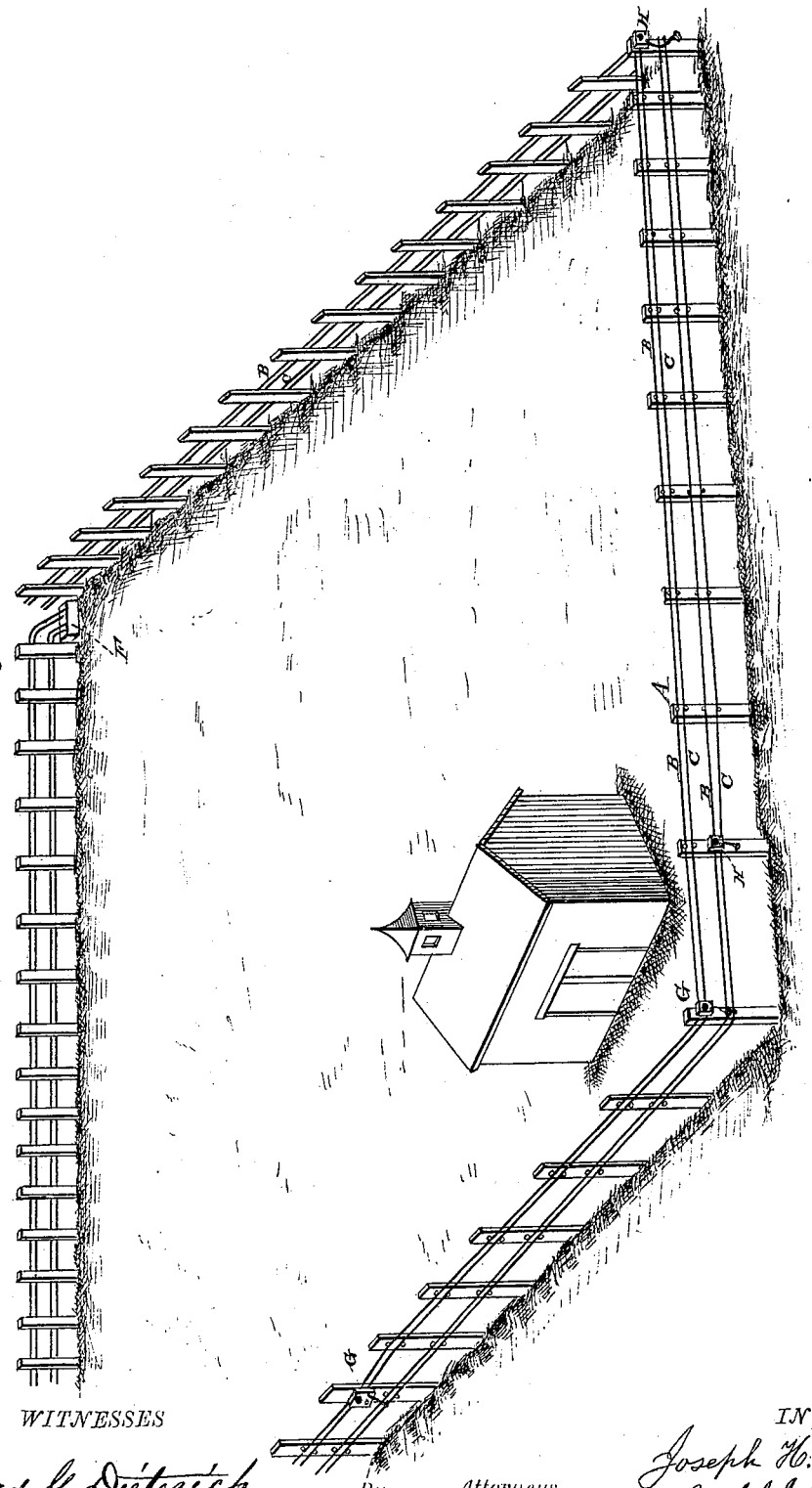

UNITED STATES PATENT OFFICE.

JOSEPH H. CONNELLY, OF PITTSBURG, PENNSYLVANIA.

ELECTRIC-WIRE FENCE.

SPECIFICATION forming part of Letters Patent No. 252,599, dated January 24, 1882.

Application filed March 8, 1881. (No model.)

*To all whom it may concern:*

Be it known that I, JOSEPH H. CONNELLY, of Pittsburg, in the county of Allegheny and State of Pennsylvania, have invented a new and useful Improvement in Electric-Wire Fences; and I do hereby declare that the following is a full and exact description thereof, reference being had to the accompanying drawings, and to the letters of reference marked thereon.

The nature of my invention consists in a wire fence having one or more of its wires insulated, and with its or their ends connected respectively with the opposite poles of an electric battery to form the circuit of the current or currents generated by the battery, all as will be hereinafter fully described.

To enable others skilled in the art with which my invention is most nearly connected to make and use it, I will proceed to describe its construction and operation.

In the accompanying drawings, which form part of my specification, Figure 1 is a front elevation of my improved fence, representing the wire connected with a battery for evolving electricity. Fig. 2 represents a farm inclosed with my improvement in fence, with telephones connected with the wire of said fence. Fig. 3 represent a top view of the fence; Fig. 4, a side view of one of the posts of the fence, partly broken away to show the manner of attaching the insulators.

In the accompanying drawings, A represents the posts, which are of ordinary construction and secured in position in any of the known ways.

B and C represent the wires, which are secured to the posts in such manner as to insulate said wires at the point of attachment to the posts. The wires B and C communicate with the poles D E of the battery F in such manner as to form the circuit of the current generated by the battery.

G H represent telephones arranged at different parts of the farm, and which may communicate with the farm-house by suitable shifting attachment.

The advantage of my improvement in fences will be apparent when the fact is considered that an animal coming in contact with negative and positive wires will receive an electric shock, which will so alarm and impress it that after having received one or more such shocks it will always avoid coming in contact therewith.

My improved fence can be so constructed as to form such a safe and efficient protection for orchards, gardens, and other inclosures that intruders would be thoroughly excluded therefrom, for the instant they came in contact with the fence in trying to enter the inclosure they would receive an electric shock, which may be made sufficiently strong to prostrate them without permanently injuring them, and in the case of large farms (and there are many such in the Western States) the advantage of my improved fence for communicating by telephone with the different sections of the farm is a very important and valuable consideration, the utility and practicability of which cannot be overestimated.

In describing my invention, its nature, and advantages, I have given the simplest form of construction, leaving the matter of insulation and the kind and form of battery employed to the judgment of the mechanic and the skill and scientific knowledge of the electrician.

A number of fences, constructed substantially as herein described, for separate and distinct farms may be made electric by a single battery, and by so doing the expense of keeping up the battery would be greatly diminished, and by such combination communication, as hereinbefore described, may be kept up between farms located at a distance from each other.

Having thus described my improvement, what I claim as of my invention is—

A wire fence having one or more of its wires insulated, and with its or their ends connected respectively with the opposite poles of an electric battery to form the circuit of the current or currents generated by the battery, substantially as herein described, and for the purpose set forth.

JOSEPH H. CONNELLY.

Witnesses:
 A. C. JOHNSTON,
 JAMES J. JOHNSTON.